United States Patent [19]
Arnold

[11] Patent Number: 5,671,907
[45] Date of Patent: Sep. 30, 1997

[54] METHOD OF ATTACHMENT OF FLEXIBLE MEMBER TO STAMPED STEEL PISTON

[75] Inventor: John Eric Arnold, North Canton, Ohio

[73] Assignee: The Goodyear Tire & Rubber Company, Akron, Ohio

[21] Appl. No.: 568,924

[22] Filed: Dec. 7, 1995

[51] Int. Cl.⁶ .................................................. F16F 9/04
[52] U.S. Cl. ............................... 267/64.27; 267/64.28; 29/454
[58] Field of Search ................... 267/64.27, 64.19, 267/64.23, 64.28; 29/454, 173, 896.91

[56] References Cited

U.S. PATENT DOCUMENTS

| | | | |
|---|---|---|---|
| 2,961,033 | 11/1960 | Galbraith | 267/64.27 X |
| 3,057,768 | 10/1962 | McGough | 267/64.27 X |

FOREIGN PATENT DOCUMENTS

| | | | |
|---|---|---|---|
| 223570 | 8/1958 | Australia | 267/64.27 |
| 1238784 | 4/1967 | Germany | 267/64.27 |
| 582823 | 10/1958 | Italy | 267/64.27 |
| 673782 | 7/1979 | U.S.S.R. | 267/64.27 |
| 807535 | 1/1959 | United Kingdom | 267/64.27 |
| 818604 | 8/1959 | United Kingdom | 267/64.27 |
| 919728 | 9/1959 | United Kingdom | 267/64.27 |
| 1147998 | 4/1969 | United Kingdom | 267/64.27 |

*Primary Examiner*—Lee W. Young
*Attorney, Agent, or Firm*—Marc R. Dion, Sr.; Roger D. Emerson

[57] ABSTRACT

An air spring assembly having a flexible member and moveable piston is provided. A bead surface of the flexible member is secured into a channel in the moveable piston to create an air-tight seal which can withstand tensile stress. The hollow piston increases the volume of the air reservoir which contributes to a reduction in the spring rate.

5 Claims, 3 Drawing Sheets

METHOD OF ATTACHMENT OF FLEXIBLE MEMBER TO STAMPED STEEL PISTON

BACKGROUND OF THE INVENTION

1. Field of Invention

This invention pertains generally to the art of air spring assemblies and more specifically to the method of attaching a flexible member to a moveable piston.

2. Description of the Related Art

In the art it is known to use air spring assemblies for a variety of applications. One such application is to cushion the ride of a tractor-trailer rig. An air spring assembly generally comprises a flexible member attached to a piston. The piston is able to advance or retreat into the interior of the flexible member thereby changing the internal volume of the assembly. In addition, the amount of air delivered to the interior of the assembly is adjustable, providing variance in the spring rate.

It is known in the art to attach the piston to the flexible member by using a snap-on component which encases the piston. However, the joint between the snap-on component and the flexible member is not able to withstand tensile stress.

Additionally, the provision of a larger internal air reservoir would allow a lower spring rate, which would translate into a more comfortable ride.

The present invention maintains the conventional external dimensions of an air spring assembly while overcoming the foregoing difficulties concerning tensile stress, eliminating the snap-on component, and increasing the internal air reservoir in a way which is simple and efficient, while providing better and more advantageous results.

SUMMARY OF THE INVENTION

In accordance with the present invention, a new and improved air spring assembly is provided.

More particularly, in accordance with the invention, a method of attaching a piston of greater internal volume directly to a flexible member of an air spring assembly is provided.

According to one aspect of the invention, an air spring assembly comprises a cylindrical flexible member having first and second spaced edges and a torodial region encompassing the second edge whereby the second edge is in the interior of the flexible member. The first edge of the flexible member has a first bead surface and the second edge has a second bead surface. The first bead surface is seated into a groove in an upper bead plate. The air spring assembly further comprises a hollow piston which has a cylindrical surface concentric with the flexible member. A first end of the piston is curved to form a channel into which the second bead surface is seated. The piston is moveable relative to the flexible member along the central axis. A piston plate is attached to the piston at the second end.

According to another aspect of the invention, the interior of the air spring assembly creates an air reservoir which is sealed against air leakage. The amount of air contained in the air reservoir is adjusted through an air inlet which is positioned in the upper bead plate.

According to another aspect of the invention, the air spring assembly can be mounted between two surfaces by pins in the upper bead plate and by at least one pin and a threaded bolt in the piston plate.

According to another aspect of the invention, a piston for an air spring assembly is formed from a cylindrical surface having an extension at one end. The extension of the cylindrical surface is curved inwardly to form a channel. A second end of the cylindrical surface is flared to create a surface for the reception of a piston plate.

According to another aspect of the invention, the piston plate is hermetically welded to the cylindrical surface. Means for mounting the piston to a surface extend through the piston plate. The mounting means are sealed against air leakage.

One advantage of the present invention is the provision of an air spring assembly which has an increased internal volume while maintaining the external dimensions of a conventional air spring.

Another advantage of the present invention is the elimination of the snap-on component of prior art air spring assemblies.

Another advantage of the present invention is the simplicity of manufacture of the piston.

Another advantage of the present invention is its ability to withstand tensile stress where the piston is joined to the flexible member.

Another advantage of the present invention is the use of hermetically welded parts which can be bench-tested for leaks.

Still other benefits and advantages of the invention will become apparent to those skilled in the art upon a reading and understanding of the following specification.

BRIEF DESCRIPTION OF THE DRAWINGS

The invention may take physical form in certain parts and arrangement of parts. A preferred embodiment of these parts will be discussed in detail in the specification and illustrated in the accompanying drawings, which form a part of this disclosure and wherein.

DESCRIPTION OF THE PREFERRED EMBODIMENT

Figure 1:
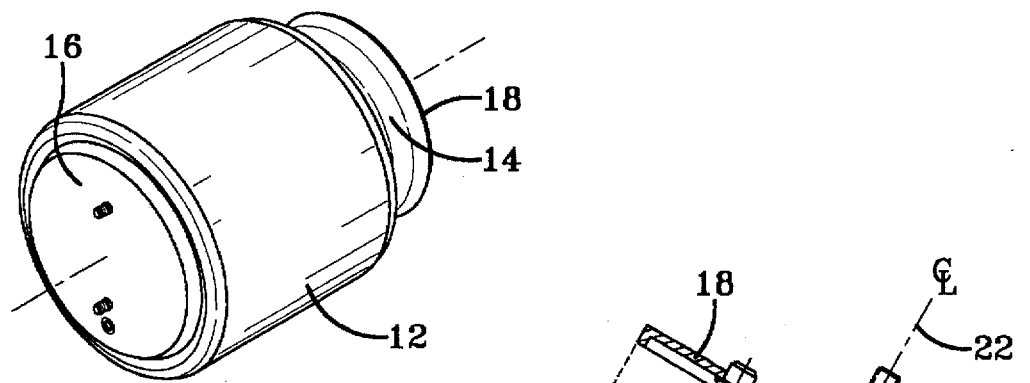
FIG. 1 is a perspective view of an air spring assembly according to the invention.

Referring now to the drawings, FIG. 1 shows an air spring assembly 10 according to the invention. The air spring assembly 10 includes a flexible member 12, a moveable piston 14, an upper bead plate 16, and a piston plate 18.

Figure 2:
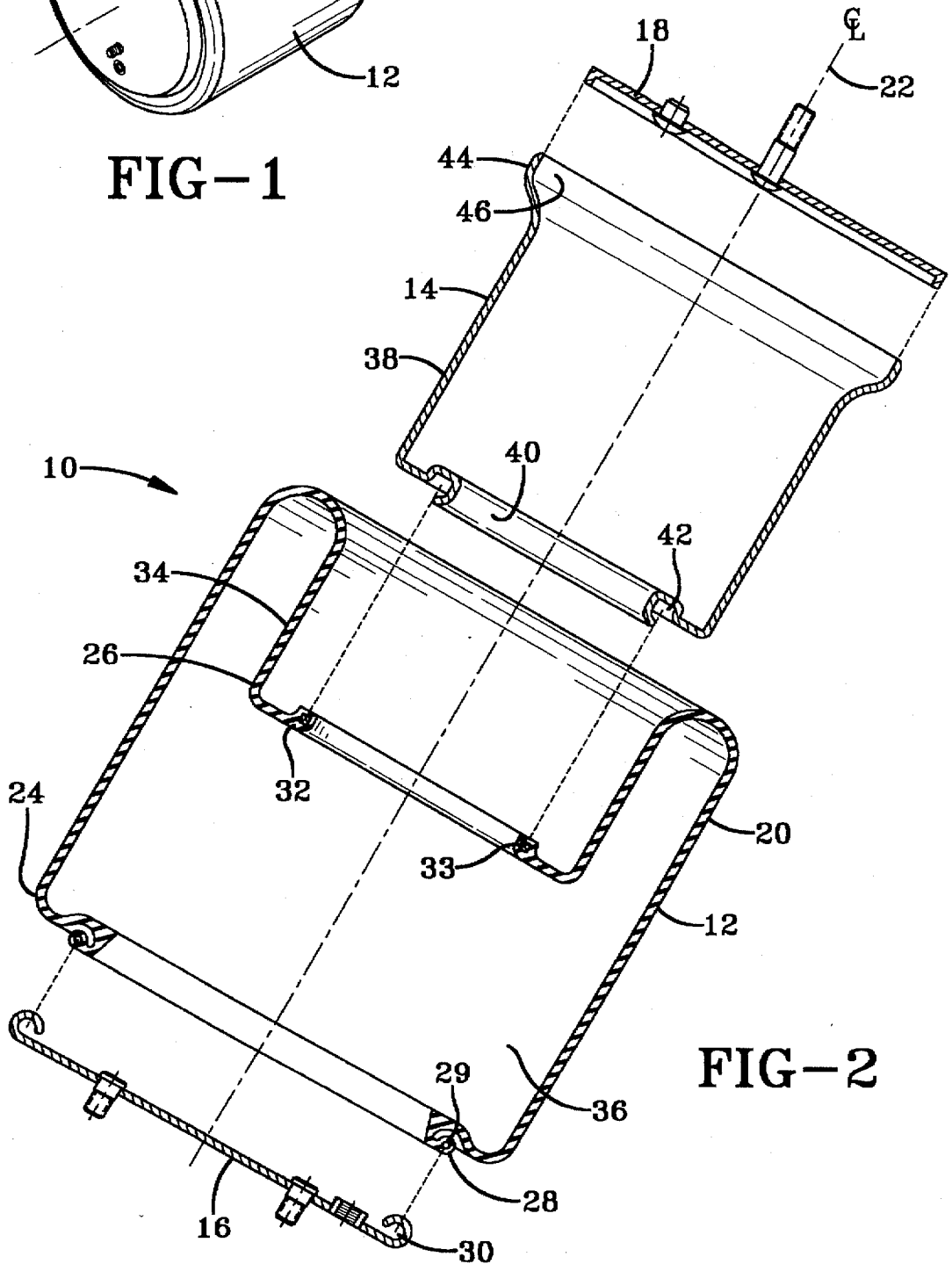
FIG. 2 is an exploded cross sectional view of the air spring assembly.

With reference to FIG. 2, the flexible member 12 comprises a cylindrical side wall 20 having a central axis 22, a first edge 24, and second edge 26. The first edge 24 comprises a first bead surface 28. In the preferred embodiment, first bead surface 28 contains an annular tensile member 29. Upper bead plate 16 comprises an annular groove 30 which receives first bead surface 28. The second edge 26 of the flexible member 12 comprises a second bead surface 32. Second bead surface 32 likewise contains an annular tensile member 33. The side wall 20 folds over into itself to create a torodial region 34 which encompasses the second edge 26. As is evident in FIG. 2, the second edge 26 is located in the interior 36 of the flexible member 12.

The piston 14 is essentially hollow and comprises a cylindrical surface 38 which is concentric with the side wall 20 of the flexible member 12 about the central axis 22.

In the preferred embodiment, a first end 40 of cylindrical surface 38 comprises an annular channel 42. A second end 44 of cylindrical surface 38 is flared to form a lip 46 for the reception of the piston plate 18.

Figure 3:
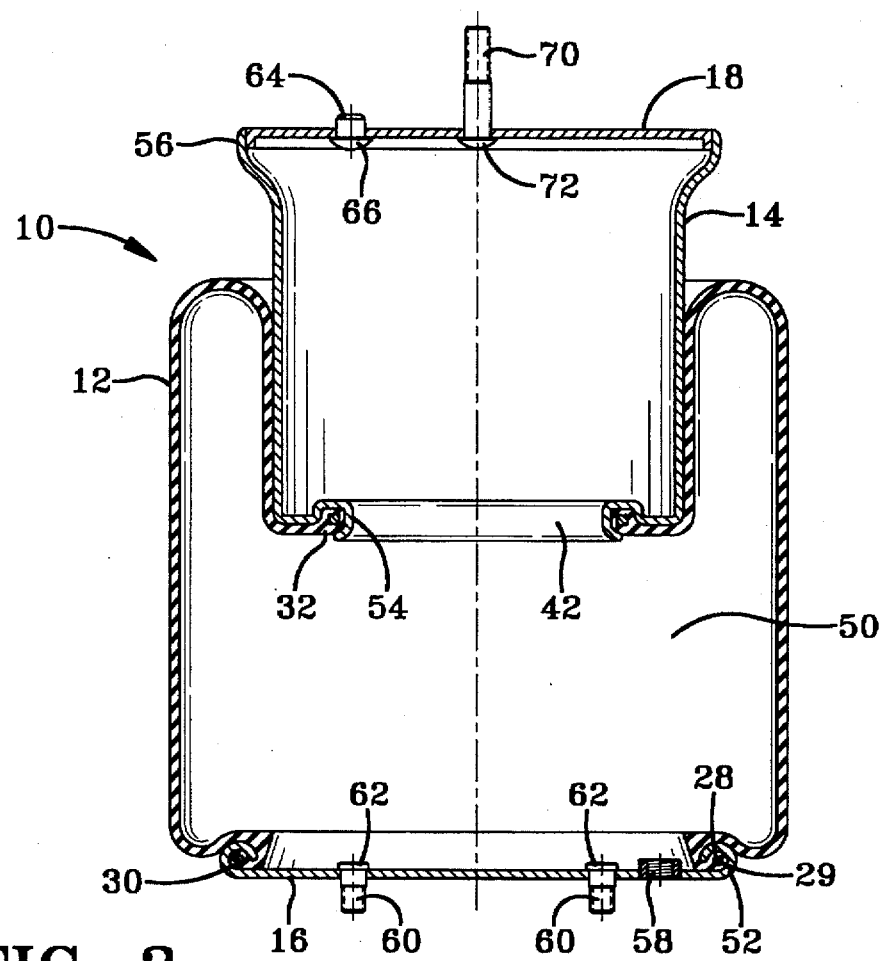
FIG. 3 is a cross sectional view of the air spring assembly.

As shown more clearly in FIG. 3, in the preferred embodiment the air reservoir 50 of the air spring assembly 10 includes the changeable interior volume of the flexible member 12 as well as the internal volume of the piston 14. The upper bead plate 16 and the piston plate 18 provide end boundaries for the air reservoir 50.

Still referring to FIG. 3, first bead surface 28 fits into groove 30 is such a way as to provide an airtight seal 52 between the upper bead plate 16 and the flexible member 12. In like manner, flexible member 12 is secured to the moveable piston 14 by seating the second bead surface 32 into channel 42 to create airtight seal 54. An important feature of the inventive air spring assembly 10 is the ability of seal 54 to withstand tensile stress. Because seal 54 is able to withstand tensile stress, the range of motion for the retraction of the piston 14 is increased over prior art air spring assemblies. The piston plate 18 is likewise sealed to the piston 14 with an air-tight weld 56 or other fastening means. In the preferred embodiment, the air spring assembly 10 is sealed against air leakage at the junctures of the various parts.

Figure 4:
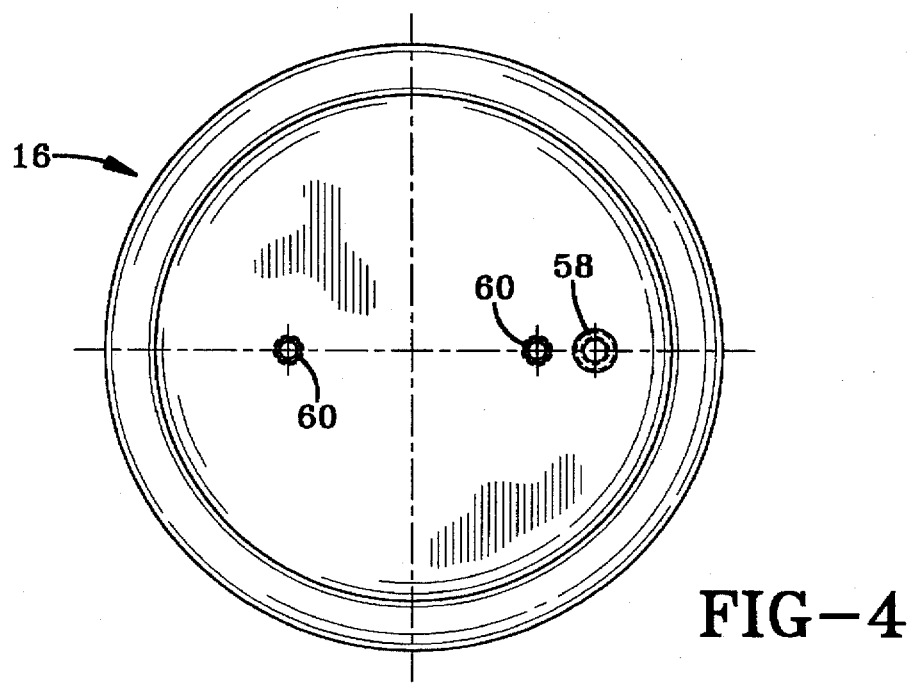
FIG. 4 is a top view of an upper bead plate according to the invention.

With reference to FIGS. 3 and 4, the flow of air to the air reservoir 50 is controlled via an air inlet 58 which is located in the upper bead plate 16. The amount of air contained in the air reservoir 50 is changeable so that the spring rate of the system can be adjusted to meet the requirements of the particular application.

The upper bead plate 16 and the piston plate 18 are equipped with hardware to permit mounting the air spring assembly 10 between two surfaces, not shown. In the preferred embodiment, the upper bead plate 16 includes pins 60 having heads 62 to the interior of the assembly 10. The piston plate 18 includes at least one pin 64 having a head 66 to the interior of the air spring assembly 10. The preferred embodiment further includes a threaded bolt 70 extending from the piston plate 18. The head 72 of bolt 70 is in the interior of the air spring assembly 10. Pins 60 are sealed against the upper bead plate 16 to prevent air leakage. Likewise, pin 64 and bolt 70 are sealed against the piston plate 18 to prevent air leakage.

Figure 5:
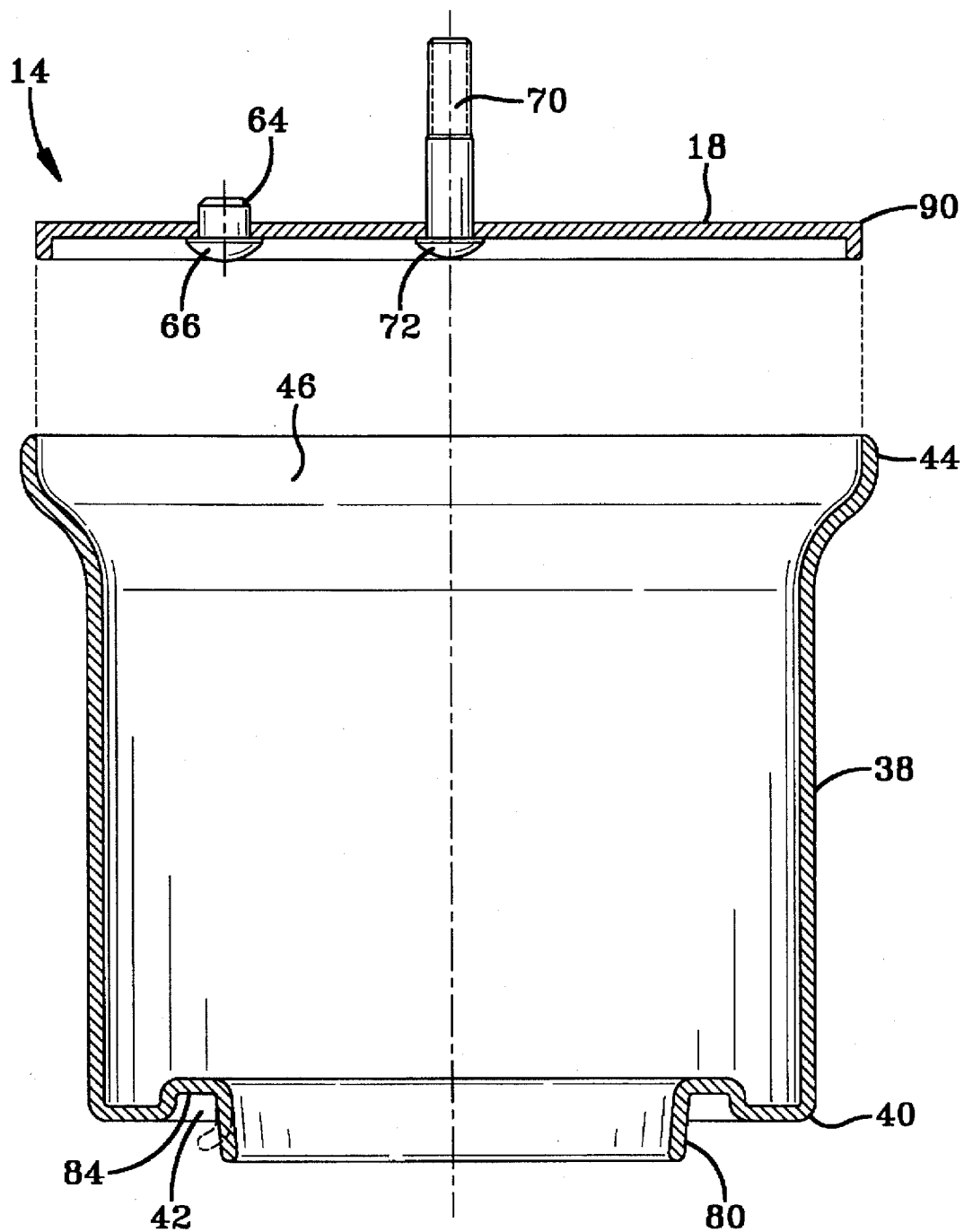
FIG. 5 is an exploded sectional view of a piston according to the invention.

Referring now to FIG. 5, the initial form of a piston 14 is shown. In the preferred embodiment, the piston 14 is formed from sheet metal. Initially, the cylindrical surface 38 includes an extension 80 at first end 40. The extension 80 comprises an inwardly directed sinuous surface 84 which forms channel 42. To form the seal 54 between piston 14 and flexible member 12, the second bead surface 32 is seated in channel 42 and then sinuous surface 84 is crimped or otherwise narrowed against the second bead surface 32 to create an airtight, tensile stress resistant juncture.

In the preferred embodiment, the second end 44 of the cylindrical surface 38 is flared slightly to create a lip 46 for the reception of an annular edge 90 of the piston plate 18.

The present invention has been described with reference to the preferred embodiment. Obviously, modifications and alterations will occur to others upon a reading and understanding of the specification. It is intended by the applicant to include all such modifications and alterations insofar as they come within the scope of the appended claims or the equivalents thereof.

Having thus described the invention, it is now claimed:

1. In an air spring assembly comprising a flexible member, said flexible member having a central axis, spaced first and second edges, a cylindrical side wall, and an interior, said side wall having a torodial region encompassing said second edge whereby said second edge is in said interior, said first edge having a first annular bead surface, said second edge having a second annular bead surface; an improved method of attaching a moveable piston to said flexible member, said method comprising the steps of:

forming a cylindrical surface, said cylindrical surface having an extension at a first end, curving said extension to create an inwardly directed sinuous curve;

seating said second annular bead surface around said curve; and, crimping said curve against said bead surface.

2. The method of claim 1 wherein said cylindrical surface is outwardly flared at a second end.

3. The method of claim 1 wherein said step of crimping said curve against said bead surface forms an airtight juncture between said moveable piston and said flexible member.

4. A method of producing an air piston assembly comprising a piston plate having an annular edge, a flexible member having a central axis, spaced first and second edges, a cylindrical side wall, and an interior, said side wall having a torodial region encompassing said second edge whereby said second edge is in said interior, said first edge having a first annular bead surface, said second edge having a second annular bead surface, and an upper bead plate having an annular groove therein for the reception of said first bead surface, said method comprising the steps of:

forming a cylindrical surface, said cylindrical surface having an extension at a first end, curving said extension to create an inwardly directed sinuous curve;

seating said second annular bead surface around said curve;

crimping said curve against said bead surface;

receiving said first bead surface into said annular groove to form an airtight juncture therebetween; and, hermetically attaching said annular edge of said piston plate to a second end of said cylindrical surface.

5. The method of claim 4 wherein said cylindrical surface comprises a flared lip at said second end and wherein said step of hermetically attaching said annular edge to said second end includes seating said annular edge in said lip.

* * * * *